United States Patent

Cole et al.

[11] 3,819,148
[45] June 25, 1974

[54] DIAPHRAGM VALVE FOR LIQUIDS

[76] Inventors: George S. Cole, 300 E. Main St., Barrington, Ill. 60010; Richard L. Ritzenthaler, 530 Devonshire Ln., Crystal Lake, Ill. 60014; Don C. Arnold, 113 Cypress Ct., Palatine, Ill. 60067

[22] Filed: June 8, 1973

[21] Appl. No.: 368,061

Related U.S. Application Data

[62] Division of Ser. No. 67,346, Aug. 27, 1970, Pat. No. 3,738,389.

[52] U.S. Cl. ............................. 251/252, 137/525
[51] Int. Cl. .......................................... F16k 31/524
[58] Field of Search .......... 251/251, 252, 66.1, 331; 137/525; 215/41; 220/60 R; 222/480, 505, 565; 92/98 R

[56] References Cited
UNITED STATES PATENTS

| | | | |
|---|---|---|---|
| 1,506,012 | 8/1924 | Lewis | 137/525 |
| 3,109,346 | 11/1963 | Julow | 92/98 R |
| 3,238,886 | 3/1966 | Johnson | 92/98 |
| 3,276,642 | 10/1966 | Johnson, Jr. et al. | 222/565 |
| 3,743,245 | 7/1973 | Demler, Sr. | 251/331 |

Primary Examiner—William R. Cline
Assistant Examiner—David R. Matthews
Attorney, Agent, or Firm—Hill, Gross, Simpson, Van Santen, Steadman, Chiara & Simpson

[57] ABSTRACT

A diaphragm valve for liquids wherein a cylindrical valve body has a surface recess at one end which receives a resilient valve member of rubber-type material of conforming size. An inlet port from a supply duct and an outlet port to a discharge duct are located in the valve body recess in spaced relation with the recess walls and bottom engaged by the valve member. A retainer holds the valve member in the recess and applies sufficient pressure on the marginal portion of the valve member to establish a liquid-proof seal between the valve member and valve body which exists at least at low liquid pressure. The resilient valve member responds to liquid pressure within the valve, and the seal with the valve body is enhanced in proportion to liquid pressure, giving the valve a self-sealing characteristic over a wide range of liquid pressures. A movable actuator has a cam surface which positions the resilient valve member in relation to the inlet port, closing the port in one position, and in other positions varying the spacing between the valve member and port for varying the rate of flow through the valve. The various parts of the valve, including the actuator, are preassembled economically, and the valve is installed at the point of use as a unit, thereby avoiding any installation step, such as a conventional compression seal, which might permit leakage in the valve.

The liquid handled by the valve flows from the supply duct to the discharge duct without traversing a region within the valve from which leakage is possible as a result of abuse or improper installation.

Valves embodying the invention easily can be installed by the user without tools of any kind, and the structure involved in installation is such that leakage at the couplings for the supply and discharge lines is virtually impossible.

10 Claims, 11 Drawing Figures

PATENTED JUN 25 1974 3,819,148
SHEET 2 OF 2

3,819,148

DIAPHRAGM VALVE FOR LIQUIDS

RELATED APPLICATIONS

This application is a division of our copending U.S. Pat. application for Ser. No. 67,346, filed Aug. 27, 1970, U.S. Pat. No. 3,738,389, which is incorporated herein by reference.

BACKGROUND OF THE INVENTION

This invention relates to a diaphragm valve for liquids such as water, and more particularly to a diaphragm valve or faucet designed mainly for household use in kitchen, lavatory and bathroom.

SUMMARY OF THE INVENTION

The invention comtemplates a diaphragm valve for liquids which is relatively inexpensive to manufacture, and capable of proper installation by the user. The valve requires virtually no maintenance, and possesses an extended life expectancy. It operates without loss of function over a wide range of fluid pressures.

The valve of the invention is virtually leak-proof, and is insensitive to foreign matter in the liquid. Further, the valve is not subject to water hammer, or other shortcomings of the valves in use at the present time.

Although various materials may be used in the valve of the invention, the valve is particularly suited to the use of modern plastic materials which are chemically inert, and subject to economical manufacture and assembly. Such materials, even when used with thin sections, can be expected to have an almost endless life and to possess characteristics which avoid deteriorating wear under conditions of use.

The valve of the invention comprises a valve body having a recess therein, a supply duct and a discharge duct. The supply and discharge ducts respectively have inlet and outlet ports in the recess in spaced relation with the recess walls and the marginal portion of the recess bottom.

A resilient valve member of rubber-type material (rubber or suitable plastic) is contained snugly within the valve body recess, overlying the inlet and outlet ports, and preferably spaced from the inlet port except when sealed over the inlet port to close the valve. The perimeter and bottom margin of the valve member respectively engage the walls and bottom of the recess with a pressure relationship which provides a liquid-proof seal.

The bottom margin of the resilient valve member preferably is an integral continuous ridge which engages the walls and bottom of the recess. This ridge, or the member itself in the absence of the ridge, responds to liquid pressure within the valve, and the seal between the valve member and valve body is enhanced in proportion to the liquid pressure, thereby giving the valve a self-sealing characteristic over a wide range of liquid pressures.

A valve member retainer is mounted on the valve body and engages the valve member with sufficient pressure to establish a pressure relationship between the valve member and the walls and bottom of the recess which provides the liquid-proof seal between the valve member and valve body which exists at least at low liquid pressure.

The valve of the invention also includes a movable actuator which has a cam surface effective in one position of the actuator to cause the valve member to close the inlet port, and in other positions to permit variations in the spacing between the valve member and the inlet port, thereby varying the rate of flow through the valve. Bearing means having fixed relation with the valve body, in some instances being a part of the valve body, are provided for supporting and guiding the movable valve actuator in coaxial relation with the valve body.

The valve body recess which receives the resilient valve member is located in an exterior end surface of the generally cylindrical valve body.

The valve member retainer overlies the recessed end surface of the valve body and has a plurality of longitudinally extending resilient fingers having inturned ends which are received within a first annular recess in the cylindrical surface of the valve body. The movable actuator overlies the retainer, and similarly has a plurality of longitudinally extending resilient fingers having inturned ends which are received within a second annular recess in the cylindrical surface of the valve body.

The resilient valve member has aligned upper and lower bosses in alignment with the underlying inlet port in the valve body recess, and the retainer has an opening through which the upper boss extends. The cam surface of the actuator engages the upper boss and controls the spacing between the lower boss and the inlet port in response to rotation of the actuator.

The valve is wholly self-contained, that is, no part of the valve having a critical relationship with any other part of the valve needs to be mounted separately during installation in order to establish the critical relationship. The actuator has a fixed relation with the valve body, insuring that the actuator will have proper relation with the valve body and the resilient valve member. Further, the relationships between the inlet duct, valve body recess, outlet duct, valve body, resilient valve member, valve member retainer and actuator are such that all possibility for leakage is avoided. There is no way, short of willful destruction, these relationships can be altered during the installation of the valve.

DESCRIPTION OF THE PREFERRED EMBODIMENT

The valve of the invention embodied in a single supply line valve is shown in FIGS. 1–11. This is the type of valve that would be used where a separate valve or faucet is desired for both hot water and cold water, sometimes called a two-valve or two-handle installation.

Figures 1, 2, 3, 4:
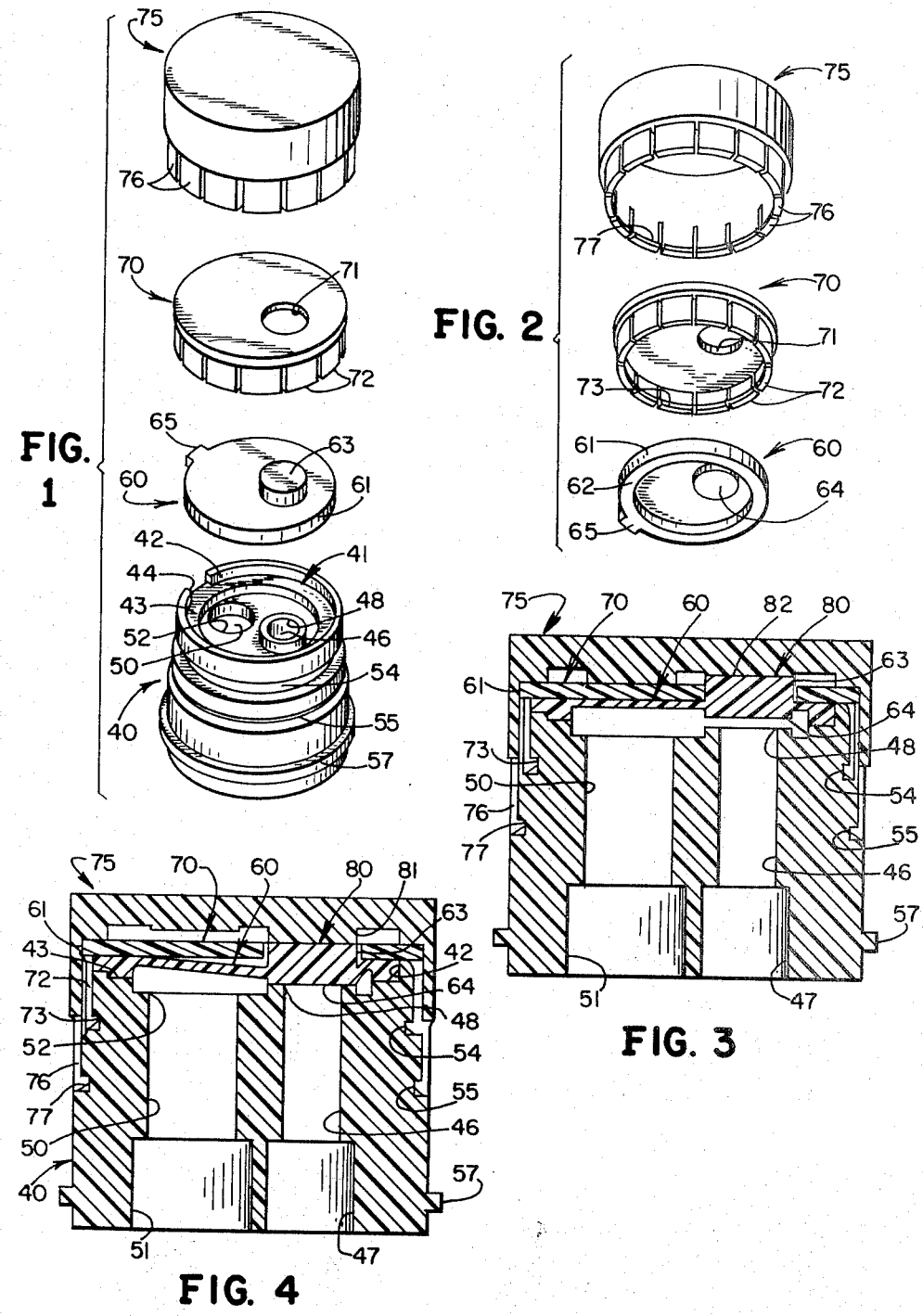
FIG. 1 is an exploded perspective view from above showing the four major elements of the valve of the invention embodied in a single supply line valve.
FIG. 2 is an exploded perspective view from below of three of the four elements shown in FIG. 1.
FIG. 3 is a longitudinal section view through a single supply line valve embodying the invention, the valve shown in an open condition.
FIG. 4 is a sectional view like FIG. 3 except that the valve is shown in closed condition.
Figure 6:
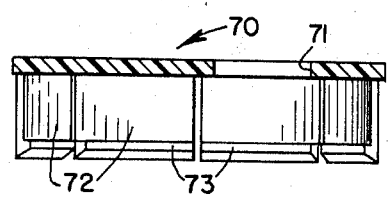
FIG. 6 is a sectional view on line 6—6 of FIG. 5.
Figure 5:
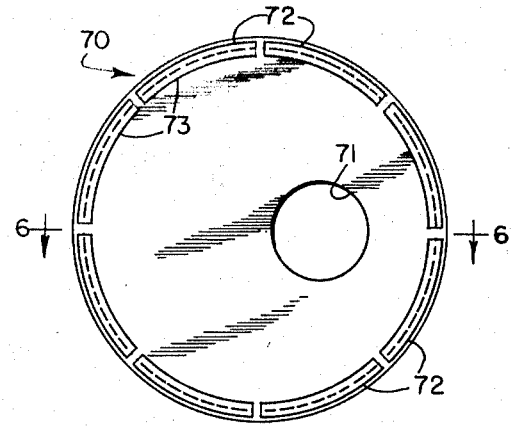
FIG. 5 is a bottom plan view of one element (valve member retainer) used in the valve of FIGS. 1–4.

FIGS. 1 and 2 are exploded perspective views showing the separate parts of the illustrated single line valve, the respective parts being shown assembled in FIGS. 3 and 4, and in greater detail in FIGS. 6–11.

Referring to FIGS. 1, 3 and 4, a valve body 40 is generally cylindrical in shape, and is provided with a recess 41 in the surface of the upper end. The recess 41 has a side wall 42 and a bottom 43, the side wall 42 being relieved to provide a keyway 44 mentioned later.

The valve body 40 includes a supply duct 46 (FIGS. 3 and 4) which has an enlarged lower end 47 for connection with a supply line, and an inlet port 48 within the recess 41. The body 40 also includes a discharge duct 50 which has an enlarged lower end 51 for connection to a spout (not shown), and an outlet port 52 within the recess 41. As shown, the supply and discharge ducts 46 and 50 are generally parallel to the cylindrical axis of the body 40. In addition, the valve body 40 has a first annular recess 54 spaced inwardly from the upper body end and a second annular recess 55 spaced below the first recess 54. The purpose of these two recesses is mentioned later. Also, the body 40 has an annular coupling flange 57 near the lower end for coupling the valve to a mounting body (not shown).

A resilient valve member 60 of rubber-type material (natural or synthetic rubber or plastic) is shaped to be received snugly within the valve body recess 41 in overlying relationship with the inlet and outlet ports 48 and 52, which ports have spaced relationship with the recess wall 42 and adjacent the recess bottom 43. The valve member 60 has a perimeter 61 and a bottom margin 62 (FIG. 2) which respectively engage the wall 42 and the bottom 43 of the recess 41 with a pressure relationship. In the preferred form, the bottom margin 62 of the valve member 60 is an integral continuous ridge, as best shown in FIG. 2, which is particularly responsive to liquid pressure within the valve, effecting a self-sealing characteristic.

In the form of the invention shown, the valve member 60 has a pair of aligned upper and lower bosses 63 and 64 (FIGS. 1 and 2), and a radial extension 65 which is received in the keyway 44 so that the bosses 63 and 64 are aligned properly with the inlet port 48.

A valve member retainer 70 overlies and engages the valve member 60 and applies pressure thereon which cooperates to establish a pressure-seal relationship between the valve member and the wall and bottom of the recess 41 in the body 40. The retainer 70 has an opening 71 (FIGS. 1 and 2) through which the upper boss 63 of the valve member 60 extends, as best shown in FIG. 3. Also, the retainer 70 has a plurality of longitudinally extending resilient marginal fingers 72, each with an inturned end 73 (FIGS. 3 and 4) received within the first annular recess 54 of the body member 40. The retainer 70 is snapped over the end of the valve body 40, and the inturned ends 73 of the fingers 72 enter the recess 54 and serve to secure the retainer in place with engineered pressure being applied to the marginal regions of the valve member 60.

A movable actuator 75 overlies the retainer 70 and has a plurality of longitudinally extending resilient marginal fingers 76 with inturned ends 77 received within the second annular recess 55. Thus, the actuator 75 snaps over the end of the valve body 40 and is retained in position in the same manner as the retainer 70, and is rotatable on the axis of the valve body.

Figure 10:
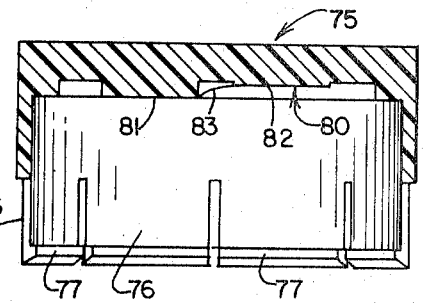
FIG. 10 is a sectional view on line 10—10 of FIG. 9.
Figure 7:
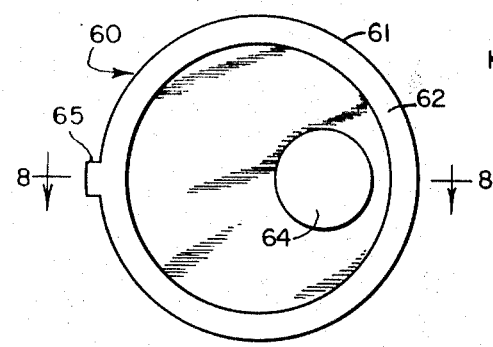
FIG. 7 is a bottom plan view of another element (resilient valve member) used in the valve of FIGS. 1–4.
Figure 9:
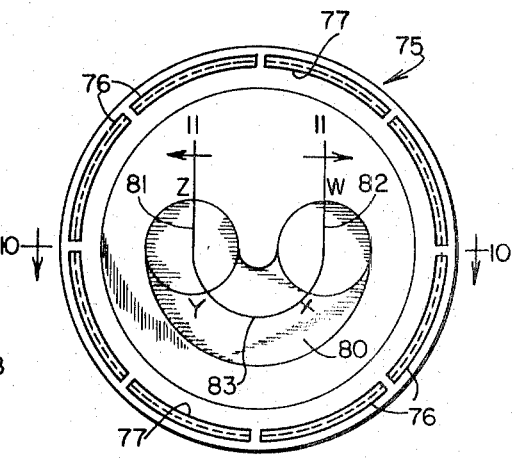
FIG. 9 is a bottom plan view of still another element (movable actuator) used in the valve of FIGS. 1–4.
Figure 11:
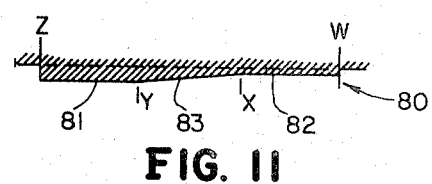
FIG. 11 is a sectional view taken substantially on irregular line 11—11 through points W,X,Y and Z of FIG. 9 showing in linear manner the profile of the cam surface on the member shown in FIGS. 9 and 10.
Figure 8:
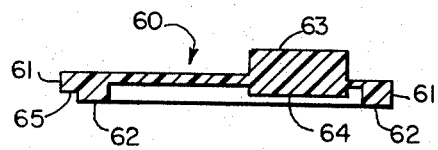
FIG. 8 is a sectional view on line 8—8 of FIG. 7.

The actuator 75 has a cam surface generally designated 80 in FIGS. 3 and 4 and shown in greater detail in FIGS. 9–11. The cam surface 80 is shaded for clarity in FIG. 9, and the linear profile of the cam surface taken on the center line W,X,Y and Z of FIG. 9 is shown in FIG. 11.

The valve shown in FIGS. 1–11 is operated by rotating the actuator 75. The valve is closed when a portion 81 (FIGS. 9–11) of the cam surface 80 opposes the boss 63 of the valve member 60 and distorts the valve member as shown in FIG. 4 so that the lower boss 64 closes the supply inlet port 48. The valve is fully open when a portion 82 (FIGS. 8–11) of the cam surface is aligned with the upper boss 63, as generally shown in FIG. 3. Settings for flow rates between closed and fully opened positions occur when intermediate inclined portions 83 of the cam surface are aligned with the upper boss 63. Movement of the sealing portion of valve member 60 is in a direction normal to the plane of the supply inlet port 48 or valve seat.

As shown in FIG. 3, the geometry of the parts is such that the valve member 60 when undistorted by the actuator 75 has spaced relation with the supply inlet port 48, and thus the central portion of the valve member is distorted by the actuator both when the valve is closed and when the valve is positioned for intermediate rates of flow.

The single line valve is wholly preassembled by the manufacturer prior to sale, and the assembly is not disturbed when the valve is installed. Various arrangements for installing the valve are possible, and, by way of example, the valve body 40 may have the aforesaid external coupling flange 57 near the lower end for cooperation with a sleeve (not shown) having an interfering internal flange for coupling to a mounting body (not shown). A coupling sleeve and mounting body are illustrated and described in U.S. Pat. No. 3,738,389, which is hereby incorporated by reference, and a similar arrangement may be used with the above described valve.

The valve is a wholly self-contained unit, and is subject to installation by the user without disturbing the assembly.

Although various minor modifications might be suggested by those versed in the art, it should be understood that we wish to embody within the scope of the patent warranted hereon all such embodiments as reasonably and properly come within the scope of our contribution to the art.

We claim as our invention:
1. A valve, comprising:
   a generally cylindrical valve body having a recess in an end surface thereof, a supply duct and a discharge duct, said ducts respectively having inlet and outlet ports in said recess in spaced relation with the recess walls, said ducts being generally parallel to the cylindrical axis;

a resilient valve member of rubber-type material contained within said recess and overlying said inlet and outlet ports, the perimeter and bottom margin of said member respectively engaging the wall and bottom of said recess with a pressure relationship providing a liquid-proof seal, said valve member responsive to liquid pressure within said valve body to enhance said seal between said valve member and said valve body in proportion to the liquid pressure, thereby giving the valve a self-sealing characteristic;

a valve member retainer mounted on said valve body and engaging said valve member with a pressure relationship cooperating to establish said pressure relationship between siad valve member and the walls and bottom of said recess;

a movable actuator overlying said valve member and having a cam surface, in part inclined, effective in one position of said actuator to cause said valve member to close said inlet port and in other positions to permit variation in the spacing between said valve member and said inlet port in a direction normal to said port, thereby varying the rate of flow through said valve; and guide means for said movable actuator in fixed relation with said valve body.

2. A valve according to claim 1 wherein said valve body has a first annular recess in the cylindrical surface and said retainer overlies said recessed end surface of said valve body and has a plurality of longitudinally extending resilient fingers having inturned ends which are received within said first annular recess to secure said retainer to said valve body.

3. A valve according to claim 2 wherein said valve body has a second annular recess in the cylindrical surface and said movable actuator overlies said retainer and has a plurality of longitudinally extending resilient fingers having inturned ends which are received within said second annular recess, said actuator being rotatable on the cylindrical axis of said valve body.

4. A valve according to claim 1 wherein said valve member has aligned upper and lower bosses in alignment with said inlet port, and said retainer has an opening through which said upper boss extends, said cam surface of said actuator engaging said upper boss and controlling the spacing between said lower boss and said inlet port.

5. A valve according to claim 1 wherein said valve body has an annular recess in the cylindrical surface and said movable actuator overlies said retainer and has a plurality of longitudinally extending resilient fingers having inturned ends which are received within said annular recess, said actuator being rotatable on the cylindrical axis of said valve body.

6. A valve according to claim 1 in which the valve body recess wall reacts against the perimeter of said valve member in response to fluid pressure acting on an exposed radially inwardly facing surface of a continuous ridge that forms said perimeter.

7. A valve according to claim 1 in which said actuator is movably retained by said valve body.

8. A valve according to claim 1 in which said actuator engages said valve member only at an area aligned with said inlet port.

9. A valve according to claim 1 in which said retainer separates said valve member from said actuator throughout the extent of said valve member except for an area thereof aligned with said inlet port.

10. A valve according to claim 1 in which said valve member has a boss projecting through a guide opening in said retainer, by which movement of any part of said valve member in the plane of said inlet port is precluded.

* * * * *